United States Patent Office 2,903,436
Patented Sept. 8, 1959

2,903,436

PROCESS FOR PRODUCING TEXTILE PRINTING PASTES CONTAINING LATICES AND POLY-AMINES AND COMPOSITIONS THEREFROM

Wolfgang Lehmann and Otto Bayer, Leverkusen-Bayerwerk, Wilhelm Kass, Koln-Stammheim, and Wilhelm Graulich, Leverkusen-Bayerwerk, Germany, assignors to Farbenfabriken Bayer Aktiengesellschaft, Leverkusen, Germany, a corporation of Germany No Drawing. Application January 18, 1955
Serial No. 482,676

Claims priority, application Germany January 18, 1954

9 Claims. (Cl. 260—29.6)

This invention relates to finishing compositions which are especially suitable for treating textile materials.

In our copending application Serial No. 253,762, filed October 29, 1951, now U.S. Patent No. 2,780,562, there is described a process for the finishing of textiles which consists in applying to the textiles, polymer emulsions together with high molecular weight compounds which are soluble or readily emulsifiable in water at least in the form of their salts, with, if desired, compounds containing two or more reactive groups and capable of converting the polymers into cross-linked insoluble compounds. The applied compounds are, if necessary, converted at elevated temperature.

In the further investigation in this field it has now been found that it is particularly advantageous to use basic higher molecular weight compounds which contain reactive epoxy groups, as polyfunctional cross-linking agents. These condensation products can be obtained from di- or poly-amines by the action of epihalohydrines or di-halohydrines. As di- or poly-amines there can be used tetramethylene diamine, hexamethylene diamine, dipropylene triamine, γ,γ′-diaminopropyl methylamine, γ,γ′-diamino-propyl ether, diaminopropyl tetramethylene diamines, bis-(γ-aminopropyl)-piperazine, or N-(1,6-hexanediamine)-3-pyrrolidone

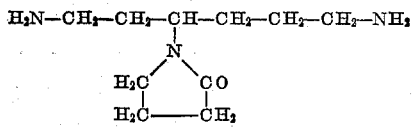

The preparation of these condensation products is described in copending application Serial No. 384,514, now U.S. Pat. No. 2,844,490, filed October 6, 1953, by Wolfgang Lehmann, Ferdinand Münz, Otto Bayer and Helmut Kleiner, which application is assigned to the same assignee. The reaction of di- or poly-amines with epichlorohydrin or dichlorohydrin must be carried out in such amounts and under such conditions that not all of the hydrogen atoms available on the nitrogen are replaced in order that the possibility of further cross-linking of the products obtained shall still be ensured.

It is possible by appropriately selecting the pH-value, concentration, temperature and reaction to prepare condensation products having a wide variety of viscosities. The condensation reactions can be interrupted at any time by the addition of acid. This addition of acid brings about stabilisation of the condensation products at the same time. The condensation products react, when heated to temperature of about 100° C. due to their content of epoxy groups as well as of —NH- and/or NH₂-groups, with self-cross-linking to form water insoluble products.

The aforesaid basic higher molecular weight compounds containing epoxy groups possess film-forming properties and act not only by self-cross-linking, but cross-link also the other basic higher molecular weight compounds contained in the binding agent. The compounds containing epoxy groups are therefore (pigment-) binding agents and cross-linking agents at the same time.

The application of such cross-linking agents which act at the same time as (pigment-) binding agents has the advantage over the majority of other cross-linking agents in that on account of their self-cross-linking capacity they can be applied in excess. When an excess of the usual water-soluble cross-linking agents, which are non-volatile on drying at 100–150° C., is used, these partly remain unchanged in the film after fixation and thus cause a lower resistance to water. In spite of this disadvantage, a small excess is preferred in practice, because even a small deficit of cross-linking agents would produce even less favourable results. Though an excess does not become apparent in the process according to the present invention, it is, nevertheless, advantageous to avoid the application of too great an overdose of polymers containing epoxy groups in certain combinations in pigment printing because otherwise the shade may sometimes become dull.

Moreover, in application, the condensation products containing epoxy groups have the great advantage over most of the other cross-linking agents that they cross-link very rapidly on drying, on the one hand, and that they are practically stable in aqueous acidic solution up to temperatures of about 50° C., on the other hand. An extremely prolonged stability of the printing pastes is thus obtained.

Compared with other cross-linking agents, these polymers containing epoxy groups exhibit a greater inherent viscosity and therefore printing pastes produced therewith do not need any thickening agents whereby a better feel and a better fastness to washing of the printed textiles are obtained.

*Example 1*

In 150 parts by weight of a 3% aqueous solution of the sodium salts of sulphonated long chain paraffins are dissolved 0.7 part by weight of the sodium salts of sulphinated long chain paraffins. The mixture is emulsified with 50 parts by weight of styrene, 48 parts by weight of acrylic acid butyl ester and 2 parts by weight of acrylic acid. The emulsion is rendered acid with 2 parts by weight of 1 N sulphuric acid and then polymerised at 30° C. until the reaction is practically complete. An emulsion is thus obtained having about 40% of solids. In order to increase the pigment compatibility and the mechanical stability, this emulsion is treated with 12.5 parts by weight of the conversion product of cetyl alcohol with ethylene oxide.

205 parts by weight of this latex are mixed with 195 parts by weight of a 10% aqueous solution (800 cp./25°) of the acetate of a basic polyurea produced from 0.05 mol of diethylene triamine, 0.95 mol of γ,γ′-diaminopropylmethylamine, and 1.01 mol of hexane diisocyanate.

30 parts by weight of a 30% aqueous solution of the hydrochloride of a basic epoxy polymer produced from 0.28 mol of dipropylene triamine, 1.00 mol of epichlorohydrin and 15 parts by weight of 50% acetic acid, and the whole is stirred until homogeneous; whereupon 200 parts by weight of a 20% red pigment paste are stirred in. It is then treated with 50 parts by weight of urea, 10 parts by weight of isooctyl alcohol, 60 parts by weight of methyl cellulose (70:1000), 235 parts by weight of water. 1000 parts by weight.

Instead of the basic polymer from dipropylene triamine and epichlorohydrin used as cross-linking agent, there can be used the polymer formed from γ,γ′-diaminopropyl-methylamine and epichlorohydrin.

The above mixture yields a very satisfactorily stable and pliable printing paste which can easily be rinsed off with water from the printing roller or film-printing screens. The printing paste is printed on to cotton or staple fibre in the usual manner. The after-treatment for cotton consists in drying at 80° C. and, for other kinds of fibres, in heating at 110–130° C. after normal drying.

The prints obtained on cotton, staple fibre or rayon excel in depth of colour, brightness of shade, very good fastnes to drying and good fastness to wet rubbing, very good to rubbing by hand in laundering, very good fastness to boiling soda and to light.

*Example 2*

1 part by weight of the sodium salts of sulphonated long chain paraffins, 12.5 parts by weight of the reaction product of cetyl alcohol and ethylene oxide, 0.7 part by weight of the sodium salts of sulphinated long chain paraffins and 0.15 part by weight of potassium persulphate are dissolved in 150 parts by weight of water.

0.4 part by weight of di-iso-propyl canthogenic disulphide, 40 parts by weight of butadiene, 40 parts by weight of acrylonitrile and 20 parts by weight of styrene are emulsified in this solution in a pressure vessel, the emulsion is rendered acid with 2 parts by weight of 1 N sulphuric acid and polymerised under its own pressure until a yield of about 100 percent is obtained. The resulting 40% emulsion is emulsified with 3 parts by weight of the formaldehyde conversion product of o-cyclohexyl-p-cresol as anti-ageing agent:

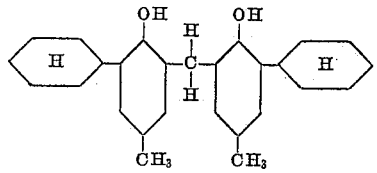

210 parts by weight of this latex are mixed with 200 parts by weight of a 10% aqueous solution (100 cp.) of the acetate of a basic polyurea produced from 0.2 mol of dipropylene triamine, 0.8 mol of γ,γ′-diaminopropyl methylamine, and 1.0 mol of hexane diisocyanate, 70 parts by weight of water and 15 parts by weight of 50% acetic acid, and the whole is stirred until homogenized, then the mixture from 150 parts by weight of a 20% aqueous pigment dye paste, 30 parts by weight of a 30% aqueous solution 300 cp./25°) of the hydrochloride of a basic polymer produced from 0.3 mol of dipropylene triamine, 1.0 mol of epichlorohydrin is stirred in and finally there are added 50 parts by weight of urea, 10 parts of weight of isooctyl alcohol, and 265 parts by weight of a benzine emulsion in water. 1000 parts by weight.

The prints produced with this printing paste are similar in their properties to those produced according to Example 1.

*Example 3*

A co-polymerised latex from 70 parts by weight of dichloroethene and 30 parts by weight of acrylic acid butyl ester is produced by polymerisation of 100 parts by weight of the mixture of monomers in 150 parts by weight of the 5% aqueous solution of the sodium salts of sulphinated long chain paraffin hydrocarbons with the addition of 2 ml. of 1 N sulphuric acid and 0.6 part by weight of the sodium salts of sulphinated long chain paraffins, at 20° C. in an autoclave until the monomers are completely converted. It shows, after 15 hours' polymerisation, a polymer content of 39.5%.

200 parts by weight of this latex are mixed with 75 parts by weight of a 20% aqueous solution of benzyl-p-hydroxydiphenyl polyglycol ether, and then are added 100 parts by weight of a 10% aqueous solution of the acetate of a basic polyoxamide (viscosity value $z_\eta = 245 \times 10^{-3}$) produced from diaminopropyl tetramethylene diamine and oxalic ester, and the whole is homogenized. Then are added 50 parts by weight of glycerol, 30 parts by weight of methyl cellulose (70:1000), 200 parts by weight of a 15% aqueous paste of copper phthalocyanine, 60 parts by weight of a 15% aqueous solution of the hydrochloride of a basic polymer produced from 0.22 mol of diaminopropyl tetramethylene diamine and 1.00 mol of epichlorohydrin, and 285 parts by weight of water. 100 parts by weight.

The property of being washed out and the stability of the printing paste is similar to those according to Example 1. The carrying out of the process is effected similarly to that in Example 1. Prints are obtained on cotton, staple fibre and rayon which excel in depth of colour, brightness of shades, very good fastness to drying and to wet rubbing.

We claim:

1. In a process for producing a textile printing paste containing as a binder a mixture of (1) an aqueous emulsion of an addition polymer of a monomer selected from the group consisting of a vinyl halide, a vinylidene halide, an acrylic acid ester of a lower alkanol, a methacrylic acid ester of a lower alkanol, acrylonitrile, a vinyl ether, butadiene, and mixtures thereof, (2) a compound selected from the group consisting of resinous polyamines and the salts of said polyamines with acids, said polyamines being devoid of epoxy groups but having recurring basic radicals selected from the group consisting of primary, secondary and tertiary amino groups and being soluble in water in the form of their salts, and (3) an emulsifier; the improvement comprising including in the aforesaid mixture a polyfunctional cross-linking agent, the latter being a hydrochloride of a basic condensation product of epichlorhydrin with a member selected from the group consisting of tetramethylene diamine, hexamethylene diamine, dipropylene triamine, γ,γ′-diaminopropyl methylamine, γ,γ′-diamino-propyl ether, diaminopropyl tetramethylene diamines, bis-(γ-aminopropyl)-piperazine, and N-(1,6-hexanediamine)-3-pyrrolidone, said cross-linking agent containing at least one free hydrogen on the amino nitrogen and also containing epoxy groups.

2. Process of claim 1 wherein said cross-linking agent is a hydrochloride of a basic condensation product of epichlorhydrin and tetramethylene diamine.

3. Process of claim 1 wherein said cross-linking agent is a hydrochloride of a basic condensation product of epichlorhydrin and dipropylene triamine.

4. Process of claim 1 wherein said cross-linking agent is a hydrochloride of a basic condensation product of epichlorhydrin and diaminopropyl tetramethylenediamine.

5. Process of claim 1 wherein said cross-linking agent is a hydrochloride of a basic condensation product of epichlorhydrin and bis-(γ-aminopropyl)-piperazine.

6. Process of claim 1 wherein said cross-linking agent is a hydrochloride of a basic condensation product of epichlorhydrin and γ,γ′-diaminopropyl methylamine.

7. As a new composition of matter, the novel textile printing paste prepared by the process of claim 1.

8. In a process for producing a textile printing paste containing as a binder a mixture of (1) an aqueous emulsion of an addition polymer of a monomer selected from the group consisting of a vinyl halide, a vinylidene halide, an acrylic acid ester of a lower alkanol, a methacrylic acid ester of a lower alkanol, acrylonitrile, a vinyl ether, butadiene, and mixtures thereof (2) a compound selected from the group consisting of resinous polyamines and the salts of said polyamines with acids, said polyamines being devoid of epoxy groups but having recurring basic radicals selected from the group consisting of primary, secondary and tertiary amino groups and being soluble in water in the form of their salts, and (3) an emulsifier; the improvement comprising including in the aforesaid mixture a polyfunctional cross-linking agent, the latter being a hydrochloride of a basic condensation product of γ,γ′-diaminopropyl methylamine with epichlorhydrin, said cross-linking agent containing at least one free hydrogen on the amino nitrogen and also containing epoxy groups.

9. Process of claim 8 wherein the said polyfunctional cross-linking agent is employed in an amount of about 1% by weight based on the weight of the printing paste.

References Cited in the file of this patent

UNITED STATES PATENTS

| | | |
|---|---|---|
| 1,977,252 | Stallmann | Oct. 16, 1934 |
| 2,780,562 | Reinartz et al. | Feb. 5, 1957 |